US009628274B1

(12) United States Patent
Jenks et al.

(10) Patent No.: US 9,628,274 B1
(45) Date of Patent: Apr. 18, 2017

(54) HARDENING TOKENIZATION SECURITY AND KEY ROTATION

(71) Applicant: Amazon Technologies, Inc., Seattle, WA (US)

(72) Inventors: Jason Jenks, Lynnwood, WA (US); Tushaar Sethi, Seattle, WA (US); Brandon B. Low, Seattle, WA (US); Jason Cetina, Shoreline, WA (US); Jesper Mikael Johansson, Woodinville, WA (US); Waylon Brunette, Seattle, WA (US); Hanson Char, Mercer Island, WA (US); Spencer Proffit, Vashon, WA (US)

(73) Assignee: Amazon Technologies, Inc., Seattle, WA (US)

( * ) Notice: Subject to any disclaimer, the term of this patent is extended or adjusted under 35 U.S.C. 154(b) by 9 days.

(21) Appl. No.: 14/542,288

(22) Filed: Nov. 14, 2014

Related U.S. Application Data

(62) Division of application No. 12/242,746, filed on Sep. 30, 2008, now Pat. No. 8,892,868.

(51) Int. Cl.
*H04L 29/06* (2006.01)
*H04L 9/08* (2006.01)

(52) U.S. Cl.
CPC .......... *H04L 9/0877* (2013.01); *H04L 9/0894* (2013.01); *H04L 2463/062* (2013.01)

(58) Field of Classification Search
CPC ..... H04L 29/06; H04L 9/0866; H04L 9/0894; H04L 9/087; H04L 2463/062; H04L 2209/127

USPC .......... 713/153, 182, 185; 726/6, 9
See application file for complete search history.

(56) References Cited

U.S. PATENT DOCUMENTS

| 6,073,160 | A | 6/2000 | Grantham et al. |
| 8,307,210 | B1 * | 11/2012 | Duane ............... H04L 9/0897 380/42 |
| 2002/0112171 | A1 | 8/2002 | Ginter et al. |
| 2002/0194119 | A1 | 12/2002 | Wright et al. |
| 2003/0217258 | A1 | 11/2003 | Bade |
| 2004/0039925 | A1 | 2/2004 | McMillan et al. |
| 2004/0091116 | A1 | 5/2004 | Staddon et al. |

(Continued)

FOREIGN PATENT DOCUMENTS

WO    WO2007/034184    3/2007

OTHER PUBLICATIONS

A Prototype of Trusted Platform Functionality on Reconfigurable Hardware for Bitstream Updates, Glas et al, Rapid System Prototyping, 2008. RSP '08. The 19th IEEE/IFIP International Symposium, IEEE, Jun. 2008.*

(Continued)

*Primary Examiner* — Luu Pham
*Assistant Examiner* — Jahangir Kabir
(74) *Attorney, Agent, or Firm* — Davis Wright Tremaine LLP

(57) ABSTRACT

A method of using a hardware security module and an adjunct application programming interface to harden tokenization security and encryption key rotation is disclosed. In various embodiments, the method comprises receiving encrypted data at a processor of a computer system, decrypting the encrypted data to cleartext in the processor, and issuing a unique token associated with the data.

20 Claims, 7 Drawing Sheets

(56) References Cited

U.S. PATENT DOCUMENTS

| | | | |
|---|---|---|---|
| 2004/0128247 A1 | 7/2004 | Sato et al. | |
| 2006/0072762 A1 | 4/2006 | Buer | |
| 2006/0136717 A1 | 6/2006 | Buer et al. | |
| 2007/0033406 A1* | 2/2007 | Hanaki | G06F 21/602 713/171 |
| 2007/0162766 A1 | 7/2007 | Watanabe | |
| 2008/0005017 A1 | 1/2008 | Poster | |
| 2008/0046982 A1 | 2/2008 | Parkinson | |
| 2008/0071903 A1 | 3/2008 | Schuba et al. | |
| 2008/0091944 A1 | 4/2008 | von Mueller et al. | |
| 2008/0123855 A1* | 5/2008 | Thomas | H04L 9/0894 380/277 |
| 2008/0140576 A1 | 6/2008 | Lewis et al. | |
| 2009/0202069 A1* | 8/2009 | Cox | G06F 21/10 380/44 |
| 2009/0300744 A1 | 12/2009 | Guo et al. | |
| 2013/0191636 A1* | 7/2013 | Aramaki | G06F 21/44 713/168 |

OTHER PUBLICATIONS

The Secure Field Bus (SecFB) Protocol—Network Communication Security for secure Industrial Process control, Swaminathan et al, TENCON 2006. 2006 IEEE Region 10 Conference, IEEE 2006.*

Final Office Action for U.S. Appl. No. 12/242,746, mailed on Nov. 8, 2013, Jason Jenks, "Hardening Tokenization Security and Key Rotation", 18 pages.
Mehuron, "Security Requirements for Cryptographic Modules", Information Technology Laboratory National Institute of Standards and Technology, Supercedes FIPS Pub 140-2, 2001, 69 pages.
Final Office Action for U.S. Appl. No. 12/242,732, mailed on Nov. 13, 2014, Jason Jenks, "Secure Validation Using Hardware Security Modules", 11 pages.
Final Office Action for U.S. Appl. No. 12/242,746, mailed on Apr. 16, 2012, Jason Jenks et al., "Hardening Tokenization Security and Key Rotation", 19 pages.
Office Action for U.S. Appl. No. 12/242,732, mailed on Apr. 7, 2014, Jason Jenks, "Secure Validation Using Hardware Security Modules", 18 pages.
Office action for U.S. Appl. No. 12/242,732, mailed on Jul. 22, 2014, Jenks et al., "Secure Validation Using Hardware Security Modules", 18 pages.
Non-Final Office Action for U.S. Appl. No. 12/242,746, mailed on Sep. 16, 2011, Jason Jenks, "Hardening Tokenization Security and Key Rotation", 16 pages.
Wikipedia—Bloom Filter. Last updated Apr. 8, 2010, Retrieved online Apr. 20, 2010 at <<http://en.wikipedia.org/wiki/Bloom_filter>>, 25 pages.
Yang et al., "Improving Memory Encryption Performance in Secure Processors", IEEE Transactions on Computers, vol. 53, No. 5, 2005, 11 pages.

* cited by examiner

US 9,628,274 B1

HARDENING TOKENIZATION SECURITY AND KEY ROTATION

CROSS-REFERENCE TO RELATED APPLICATIONS

The present disclosure is a divisional of and claims priority to U.S. patent application Ser. No. 12/242,746, filed Sep. 30, 2008, now U.S. Pat. No. 8,892,868, issued Nov. 18, 2014, which is incorporated herein by reference.

BACKGROUND

Organizations utilize a variety of methods to safeguard confidential information such as payment instrument data. Among these are encryption of data and the use of tokens to represent confidential information. However, current methods have difficulties scaling to high availability systems with large amounts of encrypted data. Rotating encryption keys for encrypted data can require either taking a system offline or duplicating data and taking the duplicate system offline while rotation occurs. With large amounts of data in a high availability environment, taking the system offline or utilizing duplicate hardware may not be viable. Furthermore, cryptographic operations taking place on a server may be vulnerable to compromise, rendering confidential information accessible.

Given the rapid increase in online commerce, online organizations demand hardened and more rapid processing of encryption functions including encryption key rotation.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Organizations with high availability servers seek to provide access to their services and data with minimal or no downtime. Providing that high availability while securing data using encryption or tokens or both, using conventional techniques, can be highly demanding of computational, financial, physical, and environmental resources.

This disclosure describes a variety of techniques for using a hardware security module (HSM) and an adjunct application programming interface (API) to provide access to cryptographic and tokenization functions within the HSM. Improvements in execution time and accessibility of the cryptographic functions are realized, and confidential data is present in cleartext only within the hardened environment of the HSM, further enhancing security.

Illustrative System Architecture

Figure 1:
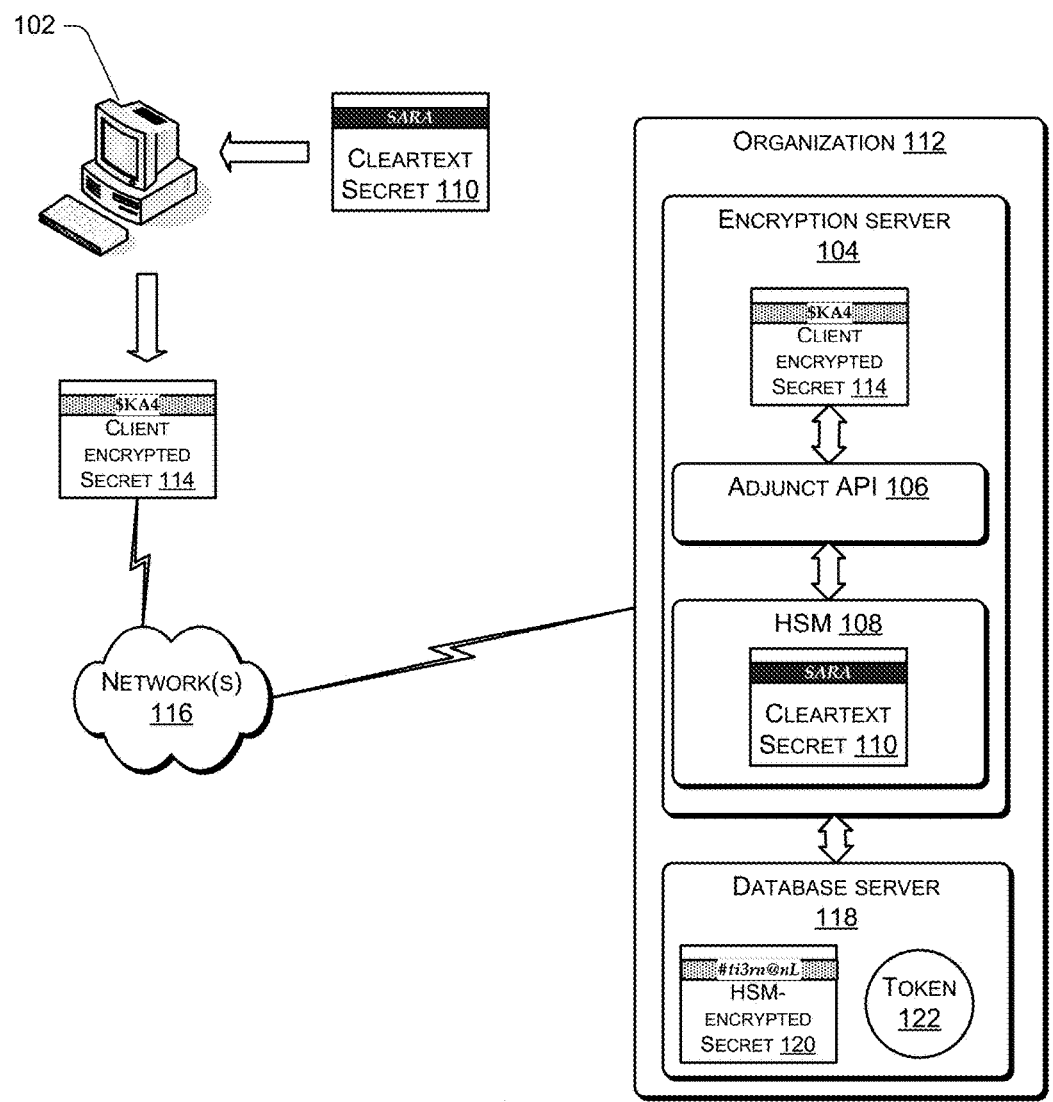
FIG. 1 is an illustrative schematic diagram of a client in communication with an organization utilizing a hardware security module (HSM) and an adjunct application programming interface (API).

FIG. 1 is an illustrative schematic diagram of a system 100, including a client computer system ("client") 102 in communication with an encryption server 104 utilizing an adjunct application programming interface (API) 106 and a hardware security module (HSM) 108.

The client computer system 102 may contain a processor or multiple processors and a memory for executing a browser or other application which accepts a cleartext secret 110 from the user. Client computer system 102, while illustrated as a workstation and separate physical device, may also be another computer server, server cluster, or other information processing device or virtualized implementation of an information processing device which utilizes the services of the encryption server 104. Client computer system 102 may also be located within organization 112. Client computer system 102 may be an application or virtualized computer executing on the encryption server itself.

In operation, a user enters a clear text secret 110, here the example string "SARA." The client computer system 102 receives the clear text secret 110.

The clear text secret is encrypted, and a client encrypted secret 114 is output from the client computer system 102, now with an example ciphertext string of "$KA4." The client encrypted secret 114 may be encrypted using a variety of cryptographic methods including, but not limited to, symmetric key and public-key cryptography.

A network 116 communicates the client encrypted secret 114 to an organization 112. The network 116 represents any one or combination of multiple different types of networks, such as cable networks, the Internet, wired, wireless, or other local or wide area networks, as well as a physical exchange of data stored on memory.

The organization 112 may range from for-profit endeavors to government agencies, and may encompass a system ranging from a single server at one geographic location to an array of many servers distributed across the world.

An encryption server 104 of the organization 112 is depicted. The encryption server 104 contains one or more processors and memory. The encryption server 104 receives the client encrypted secret 114, and utilizes an adjunct application programming interface (API) 106 to communicate with a HSM 108 of the encryption server.

An application programming interface (API) is a set of functions, procedures or classes that an operating system, library or service provides to support requests made by computer programs stored in memory and executing on a processor. Here, the Adjunct API provides the programs executing on the encryption server processor with callable hooks to easily utilize the features available within the HSM.

The hardware security module (HSM) may be implemented as a plug-in card within a host computer system or a physically external device (such as one connected via Universal Serial Bus (USB), Small Computer System Interface (SCSI), fibre channel, Ethernet, and the like). A HSM may include a tamper resistant physical package, a general purpose processor executing cryptographic functions or processor optimized for cryptographic operations. An HSM may have dedicated memory onboard, provide secure storage of keys, and have functionality for code signing to enforce access control lists (ACL), or any combination of these. The HSM provides a hardened environment for cryptographic operations. Among others, two suitable HSMs include the nShield™ device from nCipher™ Corporation Ltd of Cambridge, United Kingdom and the Luna® device from SafeNet® Inc. of Belcamp, Md., United States.

Within the HSM 108, the client encrypted secret 114 is decrypted to render cleartext secret 110. In this example, client encrypted secret 114 having a ciphertext string of "$KA4" is decrypted to the cleartext string "SARA." A more detailed description of the Adjunct API functions and tokenization follow.

A database server 118 in communication with the encryption server 104 receives an HSM-encrypted secret 120 version of the cleartext secret 110, and stores it along with a token 122 associated with the cleartext secret 110. The database server 118 contains one or more processors and memory. While shown as being external to the encryption server 104, the database server 118 may be implemented within the encryption server, or on the same physical device as the encryption server using virtualization. Also, while database server 118 is described as being part of the organization 112, in other instances, database servers may be located or administered by a third party, or both, such as a credit card company, bank, or other entity.

All of the computer systems described herein including client computer system 102, encryption server 104, the HSM 108, and database server 118 may contain a processor as well as memory including, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other computer-readable media which can be used to store the desired information and which can be accessed by processor(s) of the respective computing devices.

Illustrative Encryption Server

Figure 2:
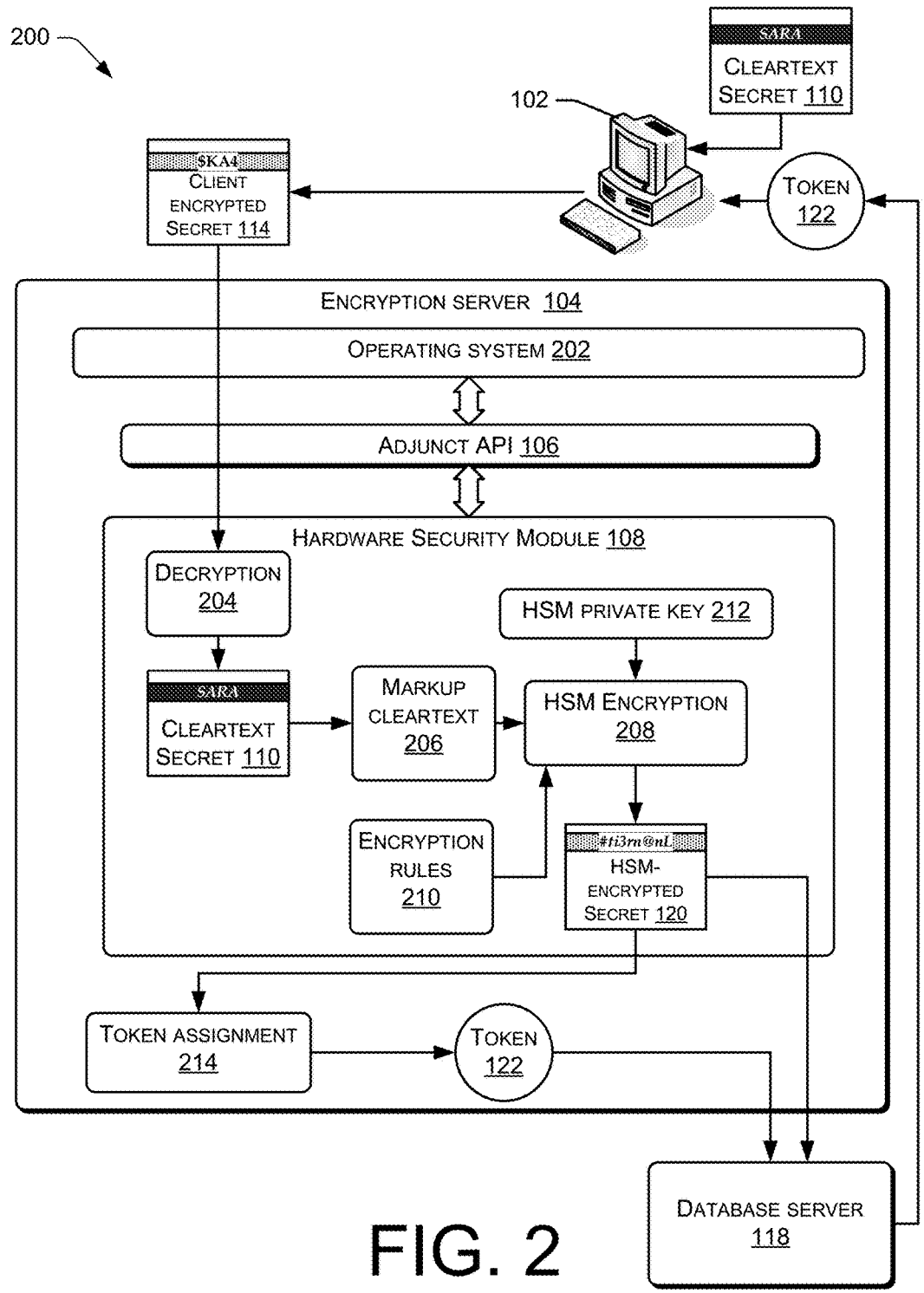
FIG. 2 is an illustrative schematic of an encryption server comprising a computer server and an HSM.

FIG. 2 is a schematic diagram 200 showing additional details of the encryption server 104. As described above, a user enters a cleartext secret 110, here with the example string "SARA." Computer system 102 encrypts cleartext secret 110 to produce the client encrypted secret 114. Cleartext secret 110 is communicated to the encryption server 104.

The encryption server 104 contains several elements including an operating system 202, Adjunct API 106, and HSM 108. Operating system 202 may be any suitable operating system including, but not limited to, Linux®, UNIX®, Microsoft Corporation's Microsoft Windows®, Apple Corporation's Mac OS®, Apple Corporation's Mac OS X®, and Wind River Systems Inc.'s VxWorks®. The operating system 202 manages the resources of the computer and acts as a host to an application program. The HSM may also have a dedicated operating system as well.

The Adjunct API 106 is in communication with the operating system 202 and the hardware security module 108. The Adjunct API 106, as described above, provides the programs executing on the encryption server processor with callable hooks to easily utilize the features available within the HSM.

Decryption module 204 decrypts client encrypted secret 114, here example ciphertext string "$KA4." Resulting cleartext secret 110 string "SARA" is processed. Processing of cleartext secret 110 may include assigning a token, marking up the cleartext, encrypting, or a combination of these elements.

A markup cleartext module 206 may add information regarding the type of data the cleartext embodies, i.e., that this is a credit card number, bank routing number, social security number, etc., to the cleartext.

The HSM encryption module 208 receives the marked-up cleartext from markup cleartext module 206.

An encryption rule module 210 selects and enforces pre-defined cryptographic parameters for the encryption based on pre-defined parameters including which of the available HSM private keys to use.

After selection by the encryption rules module 210, the encryption module 208 uses an HSM private key 212 to encrypt the marked-up cleartext data to produce the HSM-encrypted secret 120. In this example, the ciphertext string "#ti3rn@nL" results. HSM-encrypted secret 120 may be sent out of the HSM for storage in the database server 118.

The token assignment module 214 within the encryption server 104 assigns HSM-encrypted secret 120 a token 122. A token may also be assigned to marked-up text or non-marked-up text. A token may be used to refer to a piece of confidential data, but the token itself is not necessarily confidential, and may not even be encrypted. For example, a token may simply be a database record identifier, which refers to a credit card number. Thus, loss or compromise of token data does not necessarily lead to a release of confidential data. While token assignment module 214 is shown outside the hardware security module 108, it may also be located within the Adjunct API 106 or operating system 202. HSM 108 sends token 122 out of the HSM for storage in database server 118.

Figure 3:
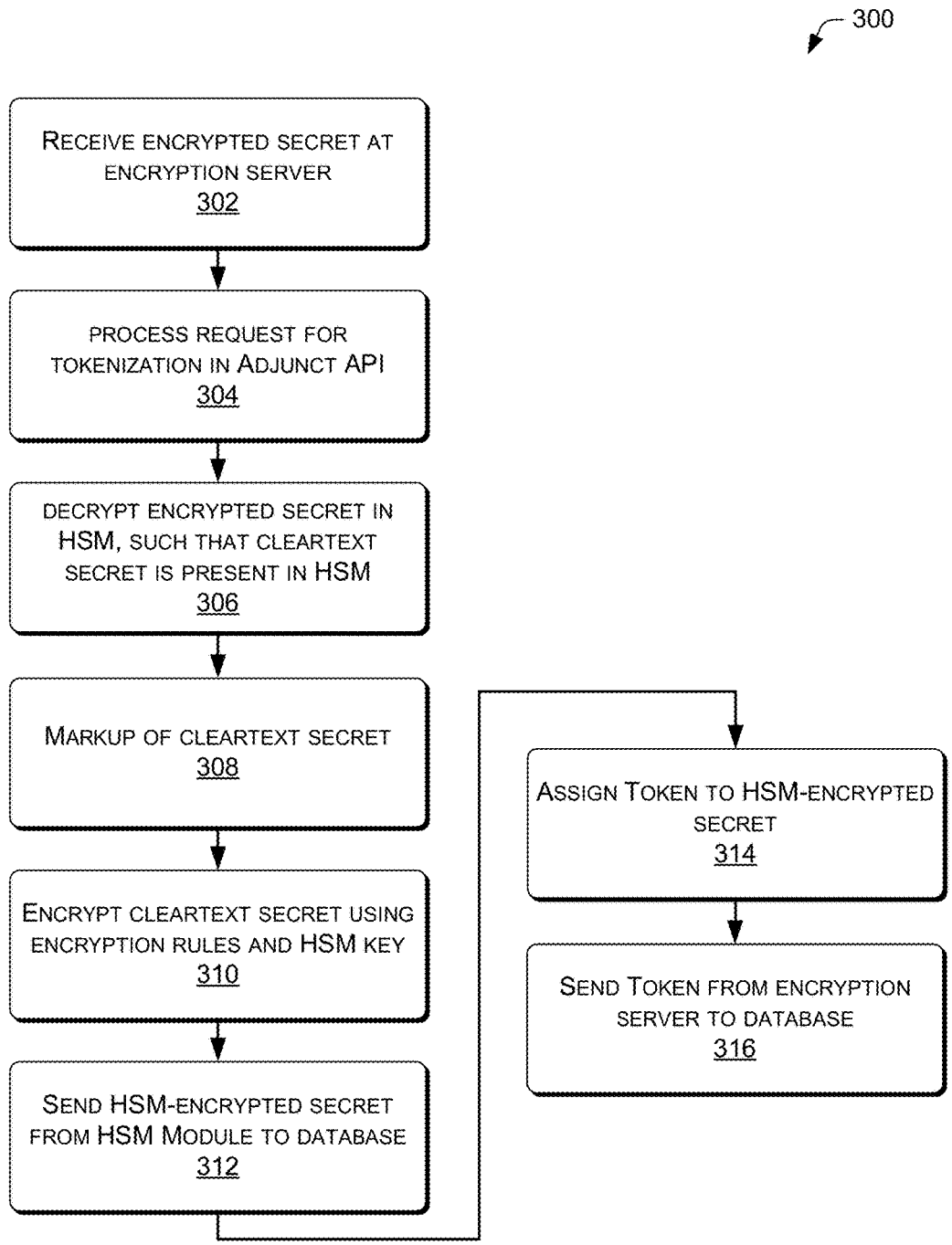
FIG. 3 is a flowchart of an illustrative method of creating tokens and encrypting data using the encryption server described in FIG. 2.

FIG. 3 is a flowchart of an illustrative method 300 of creating tokens 122 and encrypting data using an HSM 108, such as that described in FIG. 2. The method 300 has been described in the context of the systems of FIGS. 1 and 2. However, the method 300 need not necessarily be performed using the system described in FIGS. 1 and 2 and may be formed using other systems. Moreover, the systems described in FIGS. 1 and 2 are usable to perform different methods.

At 302, an encryption server receives an encrypted secret 114. The encrypted secret 114 may be received via a network 116 or from another application or HSM 108 running on the encryption server 104.

At 304, the encryption server 104 processes a request for tokenization 214 in the adjunct API 106. At 306, after passing the encrypted secret 114 to the HSM 108, the HSM 108 decrypts 204 the encrypted secret 114 within the HSM 108, producing cleartext 110 of the secret.

At 308, the cleartext secret 110 may be marked up 206. Markup may take place to provide additional information for later processing about the nature of the cleartext secret 110. For example, the cleartext secret 110 may be prepended with a particular string to indicate that the cleartext secret 110 is a credit card number, among other types of information. At 310, the cleartext secret 110 is encrypted 208 using encryption rules 210 present within the HSM 108 and using the HSM private key 212 set forth in those rules. The encryption rules may set forth roles or define particular categories of data that a requesting client may access. For example, a rule may allow client Albert to access credit card numbers encrypted with Albert's assigned encryption key, but not bank account numbers encrypted with the same key. These rules and their associated permissions may be stored within the HSM as well.

At 312, the HSM-encrypted secret 120 is sent from the HSM 108 to the database 118 for storage. While encrypted secret 120 is depicted as being generated in the HSM, encrypted secret 120 may also be generated by another HSM or by a non-HSM encryption method.

At 314, a cleartext secret 110 is assigned a token 122. At 316, the HSM sends the token 122 to the database 118 storing that information. This database 118 may be on the encryption server 104, or stored on a database server 118.

Certain acts in method 300 need not be performed in the order described, may be modified and/or may be omitted entirely, depending on the circumstances. For example, the assignment of a token shown at 314 may occur before the markup of the cleartext secret.

Figure 4:
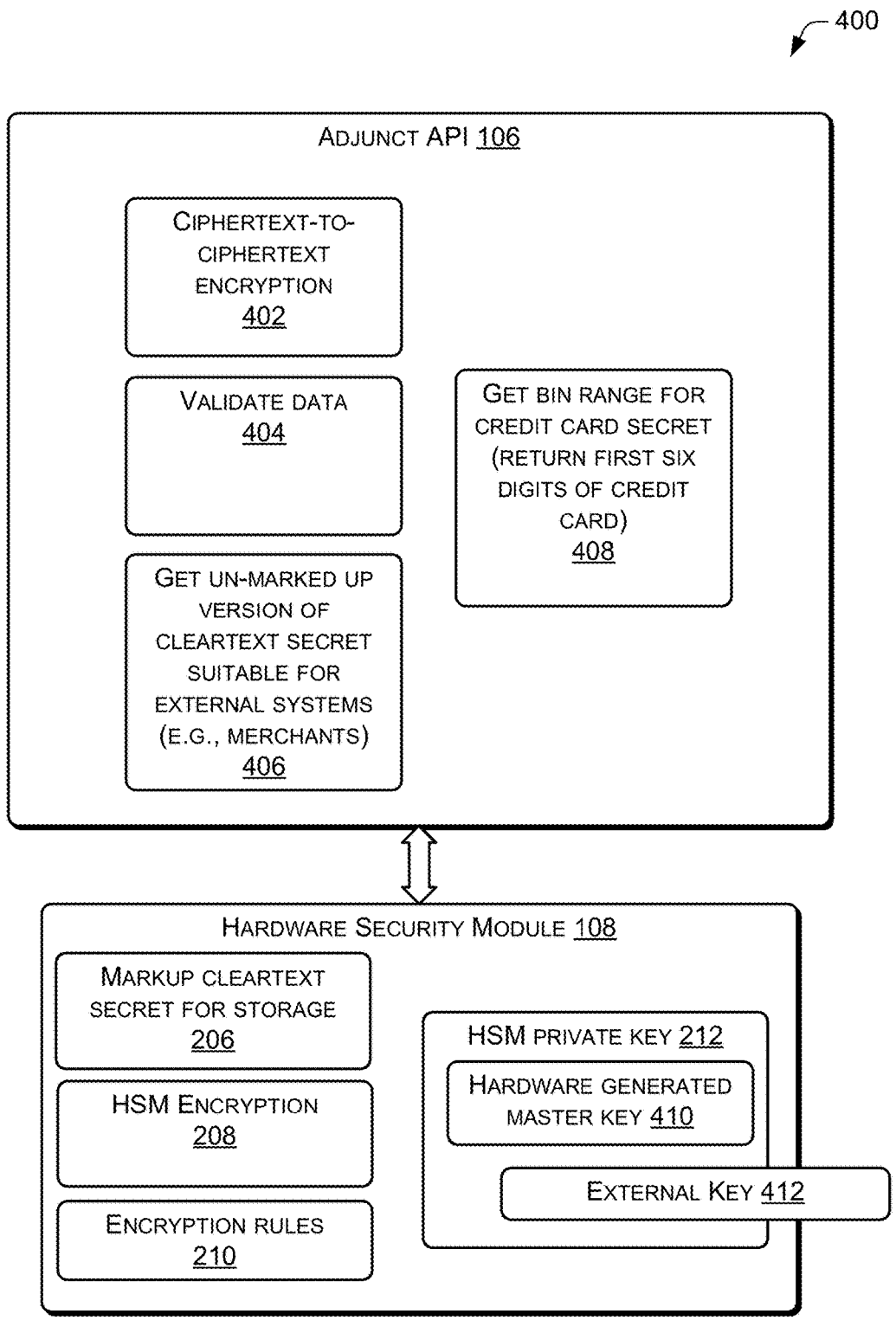
FIG. 4 is an illustrative schematic of the Adjunct API and the HSM showing elements of both.

FIG. 4 is an illustrative schematic diagram 400 of the Adjunct API 106 and the HSM 108 showing elements of both.

In one example, FIG. 4 depicts functions available within the Adjunct API 106. A token assignment module 214 is available. A ciphertext-to-ciphertext encryption module 402 is available, and may be used to rotate encryption keys, as described later. A validation data module 404 is available for validation of payment instrument data, such as credit card numbers. A get un-marked up version of cleartext secret module 406 is available. This module retrieves an encrypted secret, decrypts the encrypted secret within the HSM and removes the markup data. This module may be used to facilitate generating settlement data for third-party consumption. For example, when sending credit card numbers to a bank or processor for settlement, the markup information is irrelevant to the bank as they assume they are receiving credit card numbers, and not social security numbers. This module may provide cleartext to the third party or re-encrypt the data using a key recognized by the third party.

A get BIN range module 408 is available in the Adjunct API 106. Several types of payment options may be used by an organization, including credit cards, debit cards, charge cards, stored-value cards, electronic benefit transfer cards, and the like. In the example of credit cards, the first six digits of these payment options denote the Bank Identification Number (BIN) which identifies the institution that issued the card to the card holder. In several card processing situations production of BIN values for cards may be useful. For example, during pre-verification prior to submission to a processor. The pre-verification may include data validation such as Luhn/mod 10 checks, checksums, BIN range checks, or length checks.

The get BIN range module 408 may also be adapted to provide data for use with other payment types. For example, it may provide the International Bank Account Number (IBAN) values for bank account numbers.

The HSM is depicted at 108. Several functions are available within the HSM. For example, the markup cleartext secret for storage module 206, the HSM encryption module 208, and the encryption rules module 210 are available.

Also within the HSM is HSM private key 212. The HSM private key 212 may be composed of a hardware generated master key 410, or an external key 412, or both. The hardware generated master key 410 may be present within the HSM. Typically each hardware generated master key is unique among all other encryption keys, and is not accessible outside of the HSM.

The external key 412 may be a physical device such as a smartcard, USB device, or other memory containing a cryptographic key. For example, a quorum of external key smartcards may be required at the HSM to access administrative functions such as altering the hardware generated master key 410. However, the external key may also be a string entered into the HSM for use.

Encryption keys needed for cryptographic operations, or portions thereof, may also be stored externally and loaded into the HSM. Encryption keys need not be associated with a physical device attached to the HSM, such as a smartcard.

Figure 5:
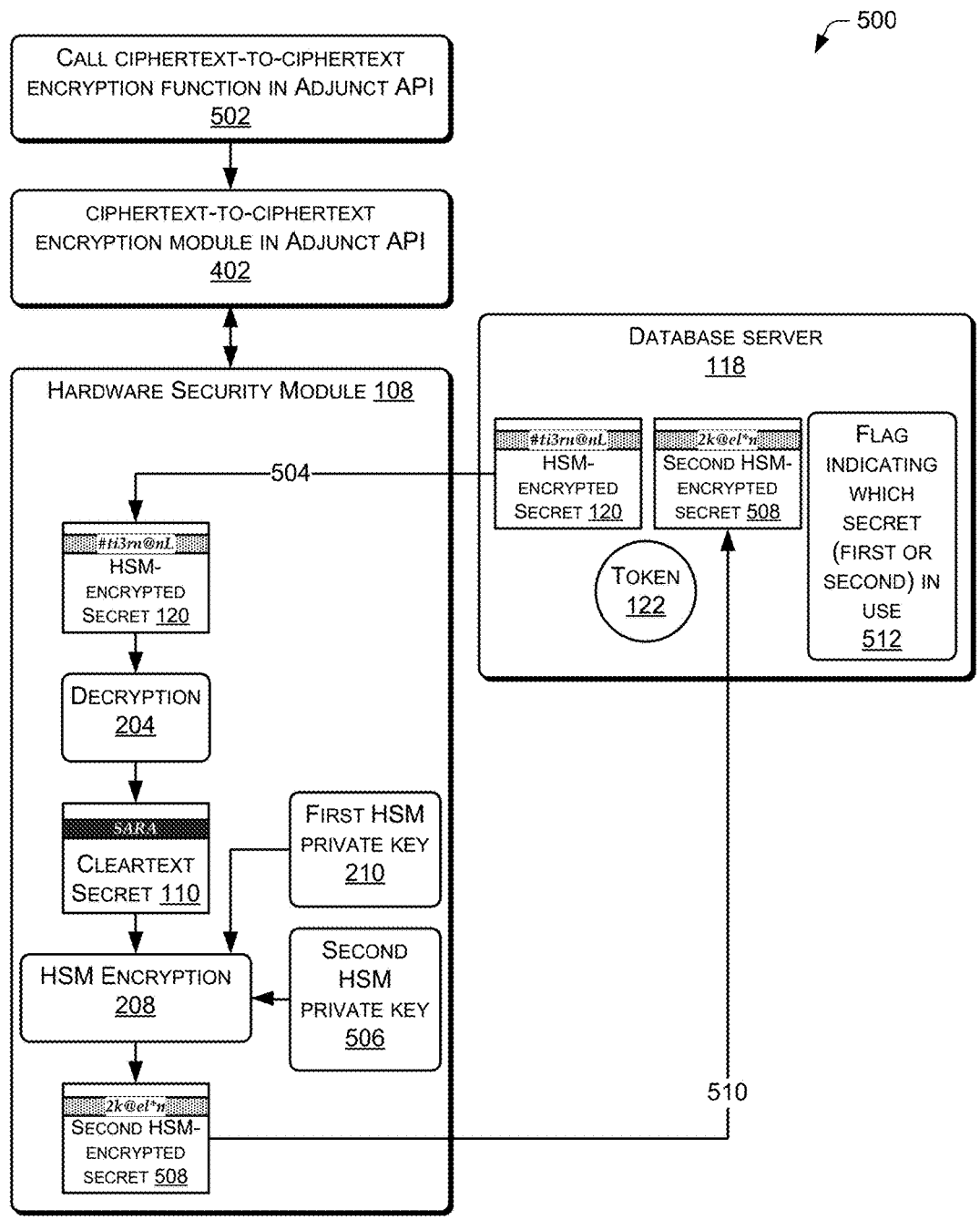
FIG. 5 is an illustrative schematic of a ciphertext-to-ciphertext encryption function called by the adjunct API and implemented in the HSM.

FIG. 5 is an illustrative schematic diagram 500 of the ciphertext-to-ciphertext encryption function in the adjunct API and implemented in the HSM.

A ciphertext-to-ciphertext encryption function 502 is called within the Adjunct API 106. Ciphertext-to-ciphertext encryption may be used to rotate encryption keys, or translate between encryption keys to enable exchange of data.

Rotation of encryption keys involves re-encrypting a secret with a different encryption key. Best practices for safeguarding confidential data in many organizations require changing encryption keys on a regular schedule or in the event of a breach of an encryption key.

The ciphertext-to-ciphertext encryption module 402 in the API communicates with the HSM 108. An HSM-encrypted secret 120 with the example ciphertext string of "#ti3rn@nL" is received 504 in the HSM 108. While encrypted secret 120 is depicted as being generated in the HSM, encrypted secret 120 may also be generated by another HSM or by a non-HSM encryption method.

The HSM-encrypted secret is decrypted 204 within the HSM 108, resulting in cleartext secret 110, for example string "SARA." Once in cleartext, the markup cleartext module 206 and encryption rules module 210 may be utilized.

HSM encryption module 208 utilizes a first HSM private key 210 or a second HSM private key 506, or both to encrypt the cleartext. The selection of first HSM private key 210 or second HSM private key 506 is discussed in more depth below.

HSM encryption module 208 outputs second HSM-encrypted secret 508, with an example ciphertext string of "2k@el*n". The token assignment module 214 may also be utilized.

Second HSM-encrypted secret 508 is output 510 for storage in database server 118. The database may maintain an association between the HSM-encrypted secret and the second HSM-encrypted secret in the database stored on the database server. Here HSM-encrypted secret 120 and second HSM-encrypted secret 508 both encrypt the same cleartext value, in this example string "SARA."

A flag 512 maintained in the database indicates which secret is in currently in use by the system. The flag may be implemented at a system level.

Figure 6:
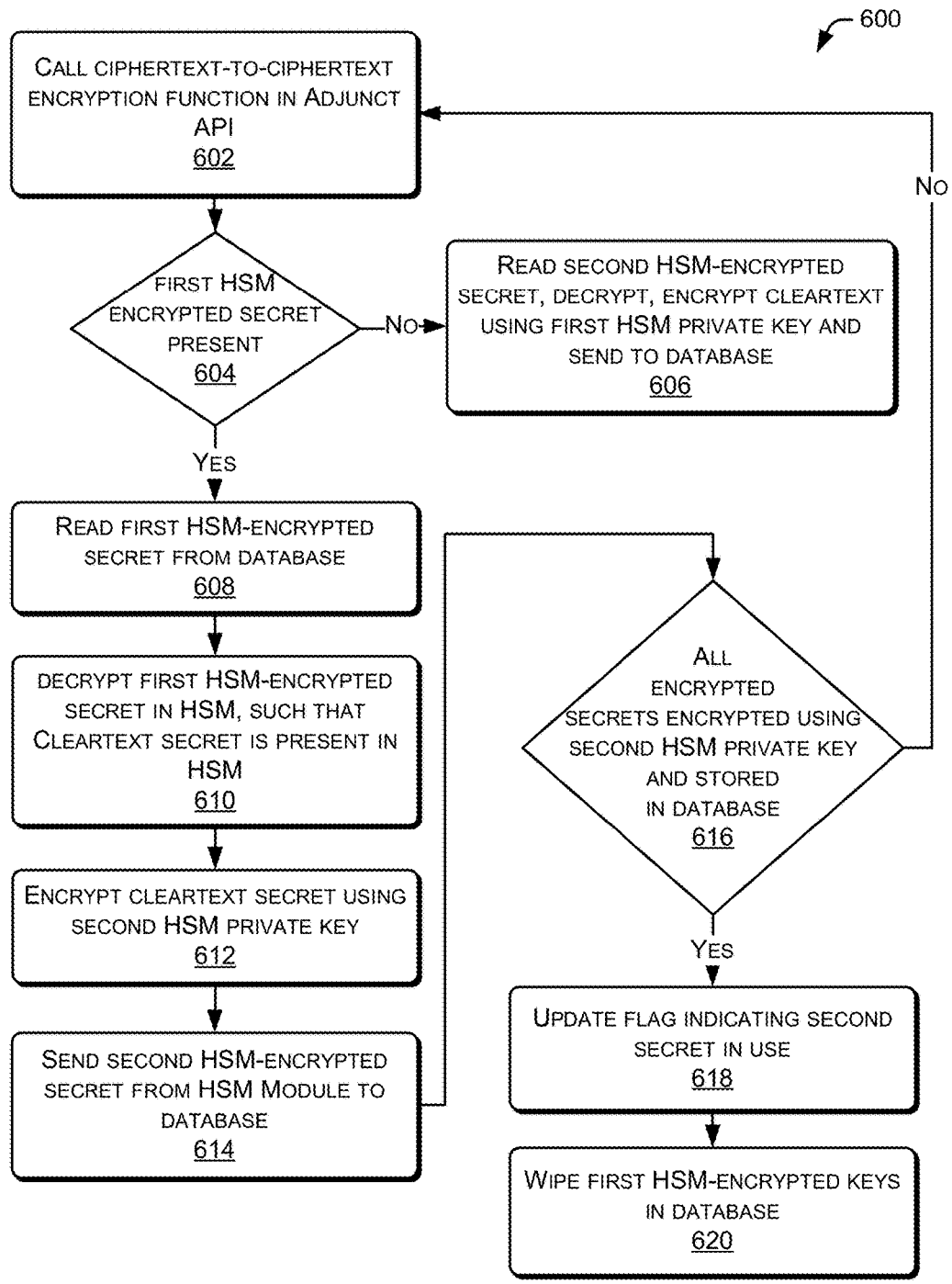
FIG. 6 is a flowchart of an illustrative method of ciphertext-to-ciphertext encryption function using an Adjunct API and an HSM.

FIG. 6 is a flowchart of an illustrative method 600 of ciphertext-to-ciphertext encryption function using an Adjunct API and an HSM.

At 602, a ciphertext-to-ciphertext encryption function 402 is called 502 in the adjunct API 106. At 604, an encryption server 104 determines whether a first HSM-encrypted secret such as 120 is present in a database 118. While encrypted secret 120 is depicted as being generated in the HSM, encrypted secret 120 may also be generated by another HSM or by a non-HSM encryption method.

If a first HSM-encrypted secret 120 is not present in the database 118 (for example, only a second HSM-encrypted secret 504 is present), then the method 600 proceeds to 606. If a first HSM-encrypted secret 120 is present in the database then the method proceeds to 608.

At 606, no first HSM-encrypted secret 120 is present, and a second HSM-encrypted secret 504 is read, decrypted 204, encrypted 208 using the first HSM private key 210, and the HSM-encrypted secret 120 is sent to the database to backfill the missing entry in the database. If a first HSM-encrypted secret 120, at 608, the first HSM-encrypted secret 120 is read from the database 118.

At 610 this first HSM-encrypted secret is decrypted within the HSM to produce cleartext 110. At 612, the cleartext 110 is encrypted 208 using a second HSM private key 506. This encryption 208 may be subject to the encryption rules module 210 discussed previously. At 614, the second HSM-encrypted secret 504 is sent from the HSM 108 to the database 118.

At 616, an encryption server, such as encryption server 104, determines whether all encrypted secrets are encrypted using the second HSM private key 506 and are stored in the database 118. If not all encrypted secrets are encrypted using a second HSM private key and stored in the database, then the method 600 proceeds to 602. If all encrypted secrets are encrypted using the second HSM private key 506 and are stored in the database 118, then 618 takes place.

At 618, all encrypted secrets are encrypted using the second HSM private key 506 and are stored in the database 118, and a flag 512 indicating that the second HSM-encrypted secret 508 is in use is updated.

At 620, the first HSM-encrypted keys 120 in the database 118 may be wiped as they have all been superseded by the second HSM-encrypted keys 508.

The first HSM-encrypted secret 120 and second HSM-encrypted secret 508 may be encrypted 208 by a different HSM, or may be encrypted by a device or method which is not an HSM, but can be read by the HSM.

Certain acts in method 600 need not be performed in the order described, may be modified and/or may be omitted entirely, depending on the circumstances. For example, the reading of the first HSM-encrypted secret 120 from the database 118 in 608 may be attempted before the determination at 604 is made.

Figure 7:
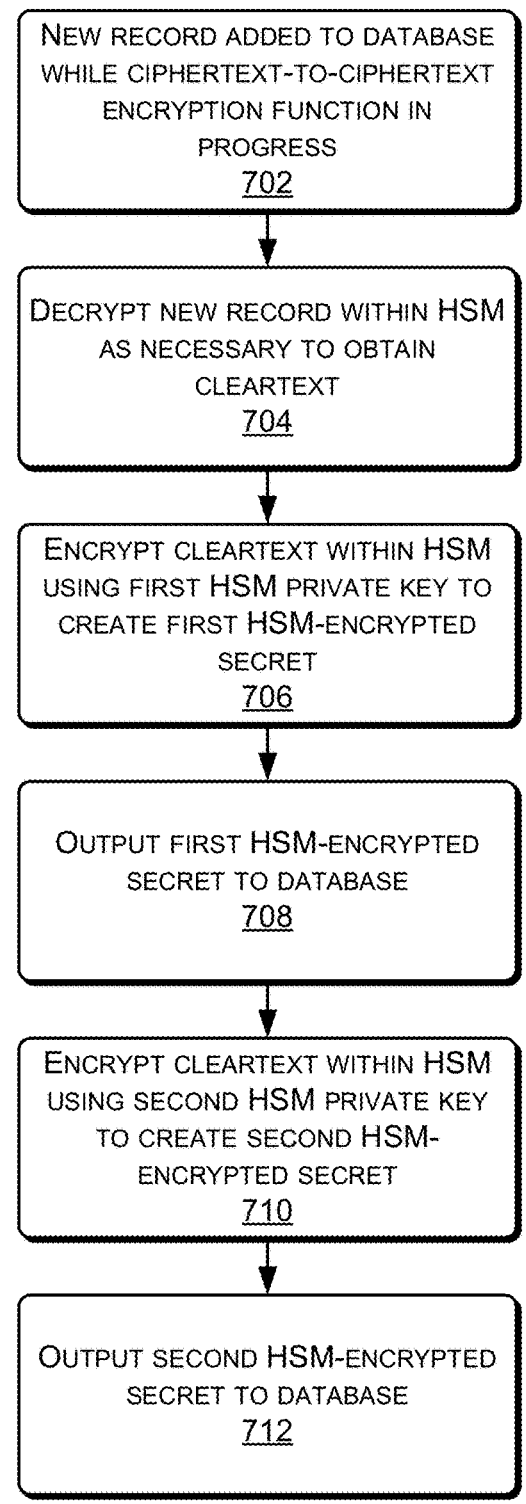
FIG. 7 is a flowchart of an illustrative method of handling insertion of new records during encryption key rotation utilizing a ciphertext-to-ciphertext encryption function in an Adjunct API and HSM.

FIG. 7 is a flowchart of an illustrative method 700 of handling insertion of new records during encryption key rotation utilizing a ciphertext-to-ciphertext encryption function 402 in an adjunct API 106 and HSM 108.

At 702, a new record has been added to the database while a ciphertext-to-ciphertext encryption function 500 is in progress. For example, this may occur during key rotation of a very large database.

At 704, the new record is decrypted 204 within the HSM 108 if necessary to obtain cleartext 110. At 706, the cleartext is encrypted 208 within the HSM using the first HSM private key 210 to create a first HSM-encrypted secret 120. This is necessary because at this time, the flag 512 indicating which encrypted secret is in use still refers to the first HSM-encrypted secret 120. At 708, the first HSM-encrypted secret 120 is output to the database 118.

At 710, the cleartext 110 within the HSM 108 is encrypted 208 using the second HSM private key 506 to create the second HSM-encrypted secret 508. At 712, the second HSM-encrypted secret 508 is output to the database 118.

Certain acts in method 700 need not be performed in the order described, may be modified and/or may be omitted entirely, depending on the circumstances. For example, the method 700 may output both the first HSM-encrypted secret 120 and the second HSM-encrypted secret 508 to the database 118 in a single operation.

Moreover, any of the acts of any of the methods described herein may be implemented at least partially by a processor or other computing device based on instructions stored on one or more computer-readable media. Computer-readable media can be any available media that can be accessed by a preprocessing system, display device, and/or digital work, as appropriate. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by a processor. Combinations of the any of the above should also be included within the scope of computer-readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method comprising:
    calling a ciphertext-to-ciphertext encryption function of an adjunct application programming interface (API), the ciphertext-to-ciphertext encryption function implemented in a hardware security module (HSM);
    accessing the HSM using the ciphertext-to-ciphertext encryption function of the adjunct API;
    receiving data from a database stored on a storage device external to the HSM; and
    performing key rotation of a first encrypted secret in the HSM using the ciphertext-to-ciphertext encryption function, the first encrypted secret received from the database, wherein the performing the key rotation comprises:
        receiving the first encrypted secret at the HSM, wherein the first encrypted secret is encrypted with a first key;
        decrypting, using the ciphertext-to-ciphertext encryption function within the HSM, the first encrypted secret to produce cleartext;
        encrypting, using the ciphertext-to-ciphertext encryption function within the HSM, the cleartext using a second key to create a second encrypted secret;
        storing the second encrypted secret in the database;
        updating a flag in the database to result in an updated flag, the updated flag indicating that the second encrypted secret is to be used for cryptographic operations; and
        storing an association between the first encrypted secret and the second encrypted secret in the database, the association is used to backfill a missing first encrypted secret in the database based at least in part on the second encrypted secret in the database.

2. The method of claim 1, wherein at least one of the first key or the second key is generated from a combination of a hardware generated master key and an externally input key.

3. The method of claim 1, further comprising:
    storing the first encrypted secret as the second encrypted secret; and updating the flag in the database to indicate that the second encrypted secret is to be used instead of the first encrypted secret.

4. The method of claim 1, further comprising:
deleting the first encrypted secret from the database, while retaining the second encrypted secret in the database.

5. The method of claim 1, further comprising:
determining that a third encrypted secret, encrypted with the second key, is stored in the database;
determining that the database does not include any encrypted secret that corresponds to the third encrypted secret and that is encrypted with the first key;
receiving the third encrypted secret at the HSM;
decrypting, using the ciphertext-to-ciphertext encryption function within the HSM, the third encrypted secret to produce another cleartext;
encrypting, using the ciphertext-to-ciphertext encryption function within the HSM, the another cleartext using the first key to create a fourth encrypted secret;
storing the fourth encrypted secret in the database;
updating the flag in the database to indicate that the fourth encrypted secret is to be used; and
storing an association between the third encrypted secret and the fourth encrypted secret in the database.

6. The method of claim 1, further comprising:
determining that the database has a first plurality of encrypted secrets such that each encrypted secret of the first plurality of encrypted secrets is encrypted with the first key;
determining that, for each encrypted secret of the first plurality of encrypted secrets, a corresponding encrypted secret of a second plurality of encrypted secrets is stored in the database, each encrypted secret of the second plurality of encrypted secrets being encrypted with the second key; and
deleting each of the first plurality of encrypted secrets from the database.

7. The method of claim 6, further comprising:
prior to determining that, for each encrypted secret of the first plurality of encrypted secrets, the corresponding encrypted secret of the second plurality of encrypted secrets is stored in the database, maintaining a flag that indicates that encrypted secrets encrypted with the first key are to be used for one or more operations; and
subsequent to determining that, for each encrypted secret of the first plurality of encrypted secrets, the corresponding encrypted secret of the second plurality of encrypted secrets is stored in the database, updating the flag to indicate that encrypted secrets encrypted with the second key are to be used for the one or more operations.

8. A non-transitory computer-readable storage medium having stored thereon executable instructions that, as a result of being executed by one or more processors of a computer system, cause performance of operations comprising:
performing key rotation on a plurality of encrypted secrets stored in a database by accessing a hardware security module (HSM), the HSM accessed by calling a ciphertext-to-ciphertext encryption function of an adjunction application programming interface (API), the ciphertext-to-ciphertext encryption function implemented in the HSM;
receiving an encrypted secret while performing the key rotation on the plurality of encrypted secrets stored in the database;
decrypting the encrypted secret to generate cleartext;
encrypting the cleartext using a first key to create a first encrypted secret;
encrypting the cleartext using a second key to create a second encrypted secret;
storing the first encrypted secret and the second encrypted secret in the database;
storing a flag in the database to result in a stored flag, the stored flag indicating that the first encrypted secret or the second encrypted secret is to be used for cryptographic operations; and
storing an association between the first encrypted secret and the second encrypted secret in the database, the association is used to backfill a missing first encrypted secret in the database based at least in part on the second encrypted secret in the database.

9. The non-transitory computer-readable storage medium of claim 8, wherein the instructions further comprise instructions that, as a result of being executed by the one or more processors, cause performance of operations comprising:
while performing the key rotation on the plurality of encrypted secrets stored in the database, indicating, using the flag, that the first encrypted secret is to be used for one or more operations;
completing the key rotation on the plurality of encrypted secrets stored in the database; and
based on completing the key rotation, indicating, using the flag, that the second encrypted secret is to be used for the one or more operations.

10. The non-transitory computer-readable storage medium of claim 9, wherein the instructions further comprise instructions that, as a result of being executed by the one or more processors, cause the computer system to:
subsequent to completing the key rotation on the plurality of encrypted secrets stored in the database, delete the first encrypted secret from the database.

11. The non-transitory computer-readable storage medium of claim 8, wherein the instructions further comprise instructions that, as a result of being executed by the one or more processors, cause performance of operations comprising:
subsequent to completing the key rotation on the plurality of encrypted secrets stored in the database, receiving another encrypted secret;
decrypting the another encrypted secret to generate another cleartext;
based on the completing the key rotation, encrypting the another cleartext using the second key to create a third encrypted secret, while refraining from encrypting the another cleartext using the first key; and
storing the third encrypted secret in the database.

12. The non-transitory computer-readable storage medium of claim 8, wherein the instructions further comprise instructions that, as a result of being executed by the one or more processors, cause performance of operations comprising:
while performing the key rotation on the plurality of encrypted secrets stored in the database, receiving a third encrypted secret from the database, wherein the third encrypted secret is encrypted using the first key;
decrypting the third encrypted secret to generate another cleartext;
encrypting the another cleartext using the second key to create a fourth encrypted secret;
storing the fourth encrypted secret in the database;
updating the flag to indicate that the fourth encrypted secret is to be used; and storing an association between the third encrypted secret and the fourth encrypted secret in the database.

13. The non-transitory computer-readable storage medium of claim 8, wherein the encrypted secret is encrypted with a key that is different from the first key and the second key.

14. The non-transitory computer-readable storage medium of claim 8, wherein the operations of receiving, decrypting, and encrypting using the first key and the second key are executed within the HSM.

15. The non-transitory computer-readable storage medium of claim 8, wherein the encrypted secret is received from a source that is different from the database.

16. A system comprising:
a computer server;
a dedicated cryptographic processor within the server comprising a storage device; and
a program stored on the storage device and executed within the dedicated cryptographic processor for-performing key rotation on a plurality of encrypted secrets, the program at least calling, using an adjunct application programming interface (API), a ciphertext-to-ciphertext encryption function implemented in the cryptographic processor, wherein the program, when executed, is configured to perform operations comprising:
accessing the cryptographic processor using the ciphertext-to-ciphertext encryption function of the adjunct API;
receiving, from a database, a first encrypted secret at the dedicated cryptographic processor;
decrypting the first encrypted secret using a first key to produce cleartext;
encrypting the cleartext using a second key to produce a second encrypted secret;
storing the second encrypted secret in the database;
storing a flag in the database to result in a stored flag, the stored flag indicating that the first encrypted secret or the second encrypted secret is to be used for cryptographic operations; and
storing an association between the first encrypted secret and the second encrypted secret in the database, the association is used to backfill a missing first encrypted secret in the database based at least in part on the second encrypted secret.

17. The system of claim 16, wherein at least one of the first key or the second key is generated from a combination of a hardware generated master key and an externally input key.

18. The system of claim 16, wherein the operations further comprise:
prior to storing the second encrypted secret in the database, updating the flag to indicate that the first encrypted secret is to be used.

19. The system of claim 18, wherein the operations further comprise:
in response to storing the second encrypted secret in the database, updating the flag to indicate that the second encrypted secret is to be used.

20. The system of claim 16, wherein the operations further comprise:
in response to storing the second encrypted secret in the database, deleting the first encrypted secret from the database.

* * * * *